US008707385B2

(12) United States Patent
Jain et al.

(10) Patent No.: US 8,707,385 B2
(45) Date of Patent: Apr. 22, 2014

(54) AUTOMATED COMPLIANCE POLICY ENFORCEMENT IN SOFTWARE SYSTEMS

(75) Inventors: Nitin Jain, Sunnyvale, CA (US); Amit Bhalla, Bangalore (IN); Anurag Singh, Bangalore (IN); Aawardhan Logandan, Bangalore (IN); Sourav Mukherjee, South San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1406 days.

(21) Appl. No.: 12/029,059

(22) Filed: Feb. 11, 2008

(65) Prior Publication Data
US 2009/0205012 A1    Aug. 13, 2009

(51) Int. Cl.
*G06F 17/00* (2006.01)
(52) U.S. Cl.
USPC ........... 726/1; 726/23; 726/25; 726/2; 705/38
(58) Field of Classification Search
USPC ............... 726/1, 23, 24–26; 705/37; 709/223; 717/178
See application file for complete search history.

(56) References Cited

U.S. PATENT DOCUMENTS

| | | | | |
|---|---|---|---|---|
| 6,070,244 | A * | 5/2000 | Orchier et al. | 726/1 |
| 7,140,035 | B1 * | 11/2006 | Karch | 726/1 |
| 7,496,552 | B2 * | 2/2009 | Huang et al. | 706/47 |
| 7,512,965 | B1 * | 3/2009 | Amdur et al. | 726/1 |
| 7,526,792 | B2 * | 4/2009 | Ross | 726/2 |
| 7,614,085 | B2 * | 11/2009 | Ben-Itzhak | 726/25 |
| 7,627,891 | B2 * | 12/2009 | Williams et al. | 726/1 |
| 7,805,752 | B2 * | 9/2010 | Newstadt et al. | 726/1 |
| 7,917,938 | B2 * | 3/2011 | Jacobson | 726/1 |
| 8,024,772 | B1 * | 9/2011 | Yehuda et al. | 726/1 |
| 8,046,833 | B2 * | 10/2011 | Gustafson et al. | 726/23 |
| 8,234,641 | B2 * | 7/2012 | Fitzgerald et al. | 718/1 |
| 8,302,208 | B1 * | 10/2012 | Feeser et al. | 726/27 |
| 2003/0065942 | A1 | 4/2003 | Lineman | |
| 2004/0111643 | A1 * | 6/2004 | Farmer | 713/201 |
| 2006/0184490 | A1 * | 8/2006 | Heim et al. | 706/46 |
| 2007/0198329 | A1 * | 8/2007 | Lyerly et al. | 705/11 |
| 2007/0266422 | A1 * | 11/2007 | Germano et al. | 726/1 |
| 2008/0148346 | A1 * | 6/2008 | Gill et al. | 726/1 |
| 2008/0222631 | A1 * | 9/2008 | Bhatia et al. | 717/178 |
| 2008/0244690 | A1 * | 10/2008 | Kulkarni et al. | 726/1 |
| 2008/0271110 | A1 * | 10/2008 | Graves et al. | 726/1 |

FOREIGN PATENT DOCUMENTS

WO    2007075850 A2    7/2007

OTHER PUBLICATIONS

Y Dognata, Authoring and Deploying Business Policies Dynamicall for Compliance Monitoring, Jun. 2011, IEEE, vol. 6, pp. 161-164.*

* cited by examiner

*Primary Examiner* — Cordelia Zecher
*Assistant Examiner* — Viral Lakhia
(74) *Attorney, Agent, or Firm* — Shun Yao; Park, Vaughan, Fleming & Dowler LLP

(57) ABSTRACT

Some embodiments of the present invention provide a system that maintains a software system. During operation, the system obtains a compliance policy for the software system and monitors the software system for a violation of the compliance policy. If such a violation is detected, the system retrieves a change package associated with the violation based on the compliance policy and automatically deploys the change package to the software system to resolve the violation.

18 Claims, 3 Drawing Sheets

US 8,707,385 B2

AUTOMATED COMPLIANCE POLICY ENFORCEMENT IN SOFTWARE SYSTEMS

RELATED APPLICATION

The subject matter of this application is related to the subject matter in a co-pending non-provisional application by inventors Nitin Jain, Amit Bhalla, Sunil Vengalil, Sourav Mukherjee, and Macks Ningombam and filed on the same day as the instant application entitled, "CHANGE RECOMMENDATIONS FOR COMPLIANCE POLICY ENFORCEMENT," having Ser. No. 12/029,049, and filing date Feb. 11, 2008.

BACKGROUND

1. Field

The present invention relates to compliance policies in software systems. More specifically, the present invention relates to a method and system for automated compliance policy enforcement through deployment of a change package.

2. Related Art

Computer systems which are maintained by an Information Technology (IT) department are subject to constant change. For example, as technology evolves, system vulnerabilities are often discovered, and new system features are released. Consequently, computer systems may require frequent upgrades, patches, configuration changes, and/or other modifications. Moreover, a system administrator may have to ensure that his/her system complies with local regulatory policies, organization-specific policies, cross-vendor requirements, and/or other rules and regulations. For example, an organization-specific policy may require FTP ports to be closed on all systems within the organization to prevent data theft. Similarly, governmental regulations may specify requirements for auditing capabilities on software systems. To facilitate compliance with the various policies, the administrator may be responsible for collecting the policies and creating a set of configuration standards.

Various difficulties may arise in ensuring compliance with the configuration standards. First, software and hardware components may require constant monitoring to keep abreast of deviations from the system configuration standards. Moreover, policy violations are currently resolved by manual lookups to determine the necessary changes to enforce compliance. In addition, the configuration standards may change in content as well as number over time. Consequently, manual enforcement of the various configuration standards may become increasingly difficult as the configuration standards, system sub-components, and the organization's needs evolve.

SUMMARY

Some embodiments of the present invention provide a system that maintains a software system. During operation, the system obtains a compliance policy for the software system and monitors the software system for a violation of the compliance policy. If such a violation is detected, the system retrieves a change package associated with the violation based on the compliance policy and automatically deploys the change package to the software system to resolve the violation.

In some embodiments, the system also reevaluates the software system using the compliance policy. If the software system conforms to the compliance policy, the system clears the violation.

In some embodiments, the software system is monitored by translating the compliance policy into a set of checks and running the checks on the software system.

In some embodiments, the compliance policy is user-authored.

In some embodiments, the violation is associated with a password reset, a security attack, a port, a configuration file, a software patch, an application type, an application version, or a standard.

In some embodiments, the change package is user-specified.

In some embodiments, the software system is an enterprise solution.

In some embodiments, the compliance policy comprises an Extensible Markup Language (XML) document.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Embodiments of the invention provide a method and apparatus for maintaining software systems. Software systems may correspond to standalone applications, application suites, operating systems, enterprise software solutions, databases, and/or other types of software. More specifically, embodiments of the invention provide a method and apparatus for automating the enforcement of a compliance policy for a software system. The compliance policy may include configuration standards corresponding to organizational regulations, cross-vendor requirements, local regulatory policies, and/or other rules and regulations for the software system.

In one or more embodiments of the invention, the compliance policy is user-authored. In addition, a configuration framework may be used to monitor the software system for violations of the compliance policy. If a violation is detected, the configuration framework may use the compliance policy to obtain a change package associated with the violation. The configuration framework may also automatically deploy the change package to resolve the violation, thus providing enforcement of the compliance policy without manual intervention by an administrator.

Figure 1:
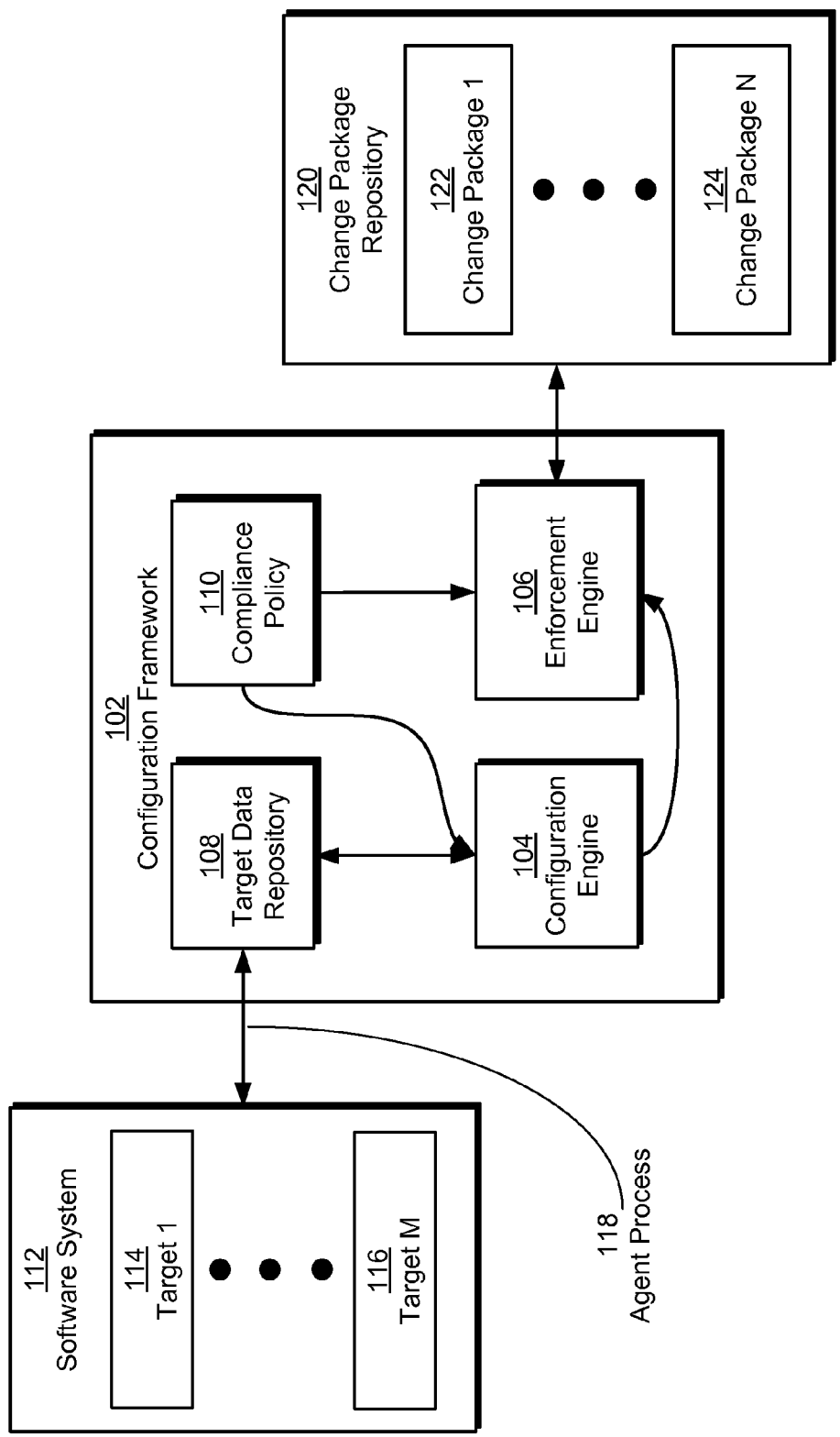
FIG. 1 shows a schematic of a system in accordance with an embodiment of the present invention.

FIG. 1 shows a schematic of a system in accordance with an embodiment of the present invention. The system is used to maintain a software system 112 and includes a change package repository 120 and a configuration framework 102. Configuration framework 102 includes a target data repository 108, a compliance policy 110, a configuration engine 104, and an enforcement engine 108. Each of the components is described in further detail below.

Software system 112 may correspond to a standalone application, application suite, operating system, enterprise software solution, database, and/or other type of software. In addition, software system 112 may be executed in a variety of environments. For example, software system 112 may be executed on a single desktop computer or workstation, or software system 112 may be distributed across multiple servers within a data center.

As shown in FIG. 1, software system 112 includes multiple targets (e.g., target 1 114, target m 116). Each target may correspond to a component or subcomponent of software system 112. For example, an enterprise solution may include one or more targets corresponding databases, business logic layers, user interfaces, network configurations, middleware, and/or other parts of the enterprise solution. In other words, targets may refer to individual software modules that perform specific tasks within software system 112. In addition, the functionality of software system 112 may be produced by the interaction of the targets with one another. For example, an enterprise solution for processing financial transactions may include one or more databases for storing data related to financial accounts, financial transactions, and users; business logic and middleware for performing financial transactions; and a user interface to allow users to access and use the enterprise solution.

Those skilled in the art will appreciate that software system 112 may be subject to a variety of organization-specific policies, local regulatory policies, cross-vendor requirements, and/or other rules and regulations. Requirements relevant to software system 112 may further be formulated into a set of configuration standards that are applied to software system 112. In one or more embodiments of the invention, the configuration standards include specific guidelines and parameters within which software system 112 must be kept to conform to the various rules and regulations required of the operation of software system 112. For example, requirements pertaining to software system 112 may be translated into configuration standards describing the opening and closing of ports, authentication and encryption mechanisms, configuration file parameter values, software patches, application compatibility, and/or other configuration aspects of software system 112.

In one or more embodiments of the invention, configuration standards from various rules and regulations are compiled into compliance policy 110. In addition, compliance policy 110 may be used by configuration framework 102 to monitor and maintain software system 112. As with software system 112, configuration framework 102 may be executed in various environments. For example, configuration framework 102 may be executed using the same machine(s) as software system 112, or configuration framework 102 may run on one or more hosts that communicate with software system 112 using a network connection.

In one or more embodiments of the invention, configuration framework 102 uses an agent process 118 to interface with software system 112. Specifically, agent process 118 may collect target information about the targets in software system 112. The target information may include data such as configuration file parameters, software patches, software types and versions, and/or other settings found on software system 112. In addition, the target information may be stored in target data repository 108 for use by configuration framework 102.

To monitor software system 112 for conformity to compliance policy 110, configuration engine 104 may compare target information in target data repository 108 with configuration standards in compliance policy 110. In one or more embodiments of the invention, the comparison is done by translating the configuration standards into a set of checks and running the checks on the target information and/or on software system 112. If a check fails, a violation is raised by configuration engine 104.

In one or more embodiments of the invention, compliance policy 110 is represented using an Extensible Markup Language (XML) document. The XML document may include tags and elements that specify and describe configuration standards, rules associated with each configuration standard, targets on which to apply the rules, tests that check for compliance to the configuration standards, and/or other information pertinent to enforcement of the compliance policy. The XML file may be parsed by configuration engine 104 to obtain relevant rules, tests, targets, and/or other information, which are then applied to the target information to determine conformity to the configuration standards within compliance policy 110. An example XML document for a configuration standard is shown below:

```
<?xml version="1.0" encoding="UTF-8"?>
<!-- drv: <standard type="create" /> -->
<std:Standard
xmlns:std="http://www.oracle.com/DataCenter/ConfigStd"
xmlns:xsi="http://www.w3.org/2001/XMLSchema-instance"
name="CriticalUpdatesStandard">
    <std:DisplayName>
        Oracle Critical Patch Update
    </std:DisplayName>
    <std:TargetType>host</std:TargetType>
    <std:Author>Oracle</std:Author>
    <std:Version>1</std:Version>
    <std:LifeCycleStatus>Production</std:LifeCycleStatus>
    <std:IsSystem>true</std:IsSystem>
    <std:Description>
        Ensures compliance to Critical Security recommendations
    </std:Description>
    <std:KeywordList>
        <std:Keyword>SECURITY_KEYWORD</std:Keyword>
    </std:KeywordList>
    <std:Body>
        <std:RuleFolder name="Critical Updates rules">
            <std:DisplayName>
                Critical Updates vulnerability rules
            </std:DisplayName>
            <std:Description>
                Evaluates security vulnerability on the hosts
            </std:Description>
            <std:Rule name="Critical Updates vulnerability rule">
                <std:DisplayName>
                    Critical Updates vulnerability rule
                </std:DisplayName>
                <std:Description>
                    Ensure that no host is vulnerable to any
                    critical patch advisory
                </std:Description>
                <std:Rationale>
                    Ensure that no host is vulnerable to any
                    critical patch advisory
                </std:Rationale>
```

```
        <std:ChangeAdvisorTag>
            <std:Type>Oracle Recommendation</std:Type>
            <std:Subtype>Security</std:Subtype>
            <std:Reason>Critical Patch Update</std:Reason>
        </std:ChangeAdvisorTag>
        <std:ViolationContextList>
            <std:Column name="HostName">
                <std:DisplayLabel>
                  Host Name
                </std:DisplayLabel>
                <std:IsKey>false</std:IsKey>
            </std:Column>
            <std:Column name="AdvisoryNames">
                <std:DisplayLabel>
                  Advisory Names
                </std:DisplayLabel>
                <std:IsKey>false</std:IsKey>
            </std:Column>
        </std:ViolationContextList>
        <std:Test>
            select this.targetGuid as TARGET_GUID,
            this.targetName as HostName,
            CPF_CA.GET_ADVISORIES(this.targetName) as
            AdvisoryNames
            from this where 'true' =
            CPF_CA.VULNERABLE_HOST(this.targetName)
        </std:Test>
      </std:Rule>
    </std:RuleFolder>
  </std:Body>
</std:Standard>
```

As shown in the XML document, a configuration standard name of "CriticalUpdatesStandard" is used. In addition, the configuration standard includes a description of "Ensures compliance to Critical Security recommendations." The configuration standard also includes a rule to "Ensure that no host is vulnerable to any critical patch advisory." The rule further includes a test written in Structured Query Language (SQL), which may be used by configuration engine 104 to check for compliance to the rule.

In one or more embodiments of the invention, compliance policy 110 is user-authored by an administrator of software system 112 using XML, as discussed above. As a result, the administrator may easily specify organization-specific configuration standards using XML. One or more portions of compliance policy 110 may also be based on rules and regulations provided by outside parties such as vendors or government agencies. These rules and regulations may be translated into XML configuration standards by the administrator and similarly incorporated into compliance policy 110. Alternatively, XML-formatted configuration standards may be available on servers corresponding to software vendors, agencies, and/or other third parties. The configuration standards may be obtained from the servers and directly placed into compliance policy 110 without further formatting by the administrator. Consequently, the use of XML to describe compliance policy 110 may allow rules and regulations from multiple sources to be consolidated into a single document. Moreover, the document may easily be updated to reflect changes in software system 112 and/or associated rules and regulations.

If a violation is detected by configuration engine 104, the violation is passed to enforcement engine 106, which may then use compliance policy 110 to obtain a change package (e.g., change package 1122, change package n 124) associated with the violation. More specifically, compliance policy 110 may include a link or pointer to the change package, which enforcement engine 106 may use to retrieve the change package. Enforcement engine 106 may then automatically deploy the change package to resolve the violation. In other words, compliance policy 110 includes both tests for conformity to configuration standards and solutions to detected violations of configuration standards. Furthermore, the solutions may automatically be applied to software system 112 to resolve the violations without manual intervention by the administrator. As a result, configuration framework 102 and change package repository 120 may provide an automated mechanism for enforcing compliance policy 110 on software system 112.

For example, the test in the above XML document includes SQL code that checks for advisories regarding critical patches. If any advisories exist, the test also retrieves a list of critical patches, which may be stored in change package repository 120 and applied to software system 112 to address the advisories. As with the configuration standards, references to the change packages may be added to compliance policy 110 by the administrator or another author of the XML document. For example, a web crawler may be used to obtain a list of security vulnerabilities and patches for software system 112 from one or more websites. The web crawler may then add the security vulnerabilities as configuration standards to compliance policy 110, store the patches in change package repository 120, and provide links and/or pointers to the patches in compliance policy 110.

Those skilled in the art will appreciate that change package repository 120 may include a combination of user-authored and third-party change packages. For example, change packages in change package repository 120 may include scripts or batch files written by the administrator to open and close ports, update database entries, apply patches, and/or perform other modifications to software system 112. On the other hand, change packages may be provided by software vendors, open source communities, and/or other third parties. Such change packages may be placed in change package repository 120 by obtaining the change packages from servers corresponding to the third parties. Thus the administrator may be able to more efficiently maintain software system 112 by obtaining patches, fixes, and/or other compliance policy enforcement solutions from a variety of sources.

Figure 2:
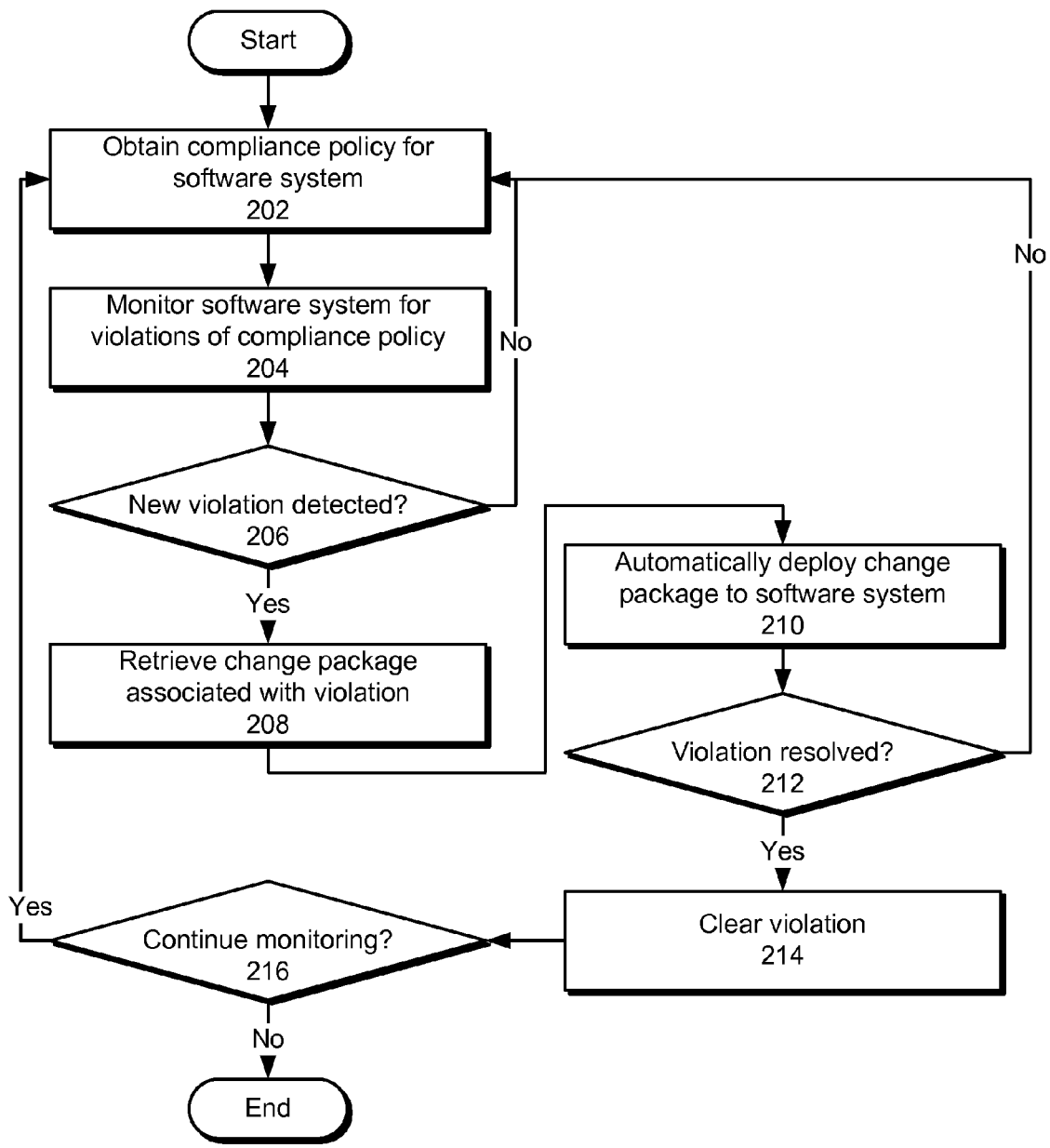
FIG. 2 shows a flowchart of automated compliance policy enforcement in a software system in accordance with an embodiment of the present invention.

FIG. 2 shows a flowchart of automated compliance policy enforcement in a software system in accordance with an embodiment of the present invention. In one or more embodiments of the invention, one or more of the steps may be omitted, repeated, and/or performed in a different order. Accordingly, the specific arrangement of steps shown in FIG. 2 should not be construed as limiting the scope of the invention.

Initially, a compliance policy is obtained for a software system (operation 202). The compliance policy may be authored by an administrator of the software system, obtained from a vendor of the software system, and/or issued by a regulatory agency. The compliance policy may also be formatted using XML to facilitate the collection of various policies and regulations into a single document. The use of XML may additionally allow changes in organizational, local, and/or vendor-specific rules and regulations to be incorporated easily into the compliance policy.

The software system is monitored for violations to the compliance policy (operation 204). Specifically, the compliance policy may include a set of configuration standards related to the enforcement of rules and regulations relevant to the software system. The software system is compared against each configuration standard to detect violations of the compliance policy (operation 206). If no new violations are detected, the compliance policy is periodically updated and the software system is continually monitored for violations to the compliance policy (operations 202-204).

If a new violation is detected, a change package associated with the violation is retrieved (operation 208) and automatically deployed (operation 210). A link or pointer to the change package may be stored in the compliance policy and point to the location of the change package in a change package repository. Furthermore, the change package may be obtained from the change package repository using the link or pointer and deployed to fix the violation. For example, a configuration standard for a security vulnerability may include a test for the security vulnerability. If the security vulnerability is detected using the test, the configuration standard may include a link to a patch for the security vulnerability. The patch may be retrieved from the change package repository using the link and deployed to fix the security vulnerability. Alternatively, a script in the change package repository may be run with the link to the patch as a parameter. The script may then retrieve the patch from a third-party website and apply the patch to the software system.

After deploying the change package, the software system may be examined for resolution of the violation (operation 212). If the violation is resolved by the change package, the violation is cleared (operation 214). If the violation is not resolved, further attempts may be made to deploy the change package or another change package to resolve the violation (operation 206-210). In addition, an administrator of the software system may be notified of the uncleared violation so that the administrator may use other methods to resolve the violation.

The software system may continue to be monitored (operation 216) using the compliance policy as long as the software system is in use. If violations are detected, change packages are retrieved and deployed to resolve the violations (operations 206-214). In addition, the compliance policy may be periodically updated (operation 202) to obtain configuration standards that reflect the most recent changes to rules and regulations for the software system.

Figure 3:
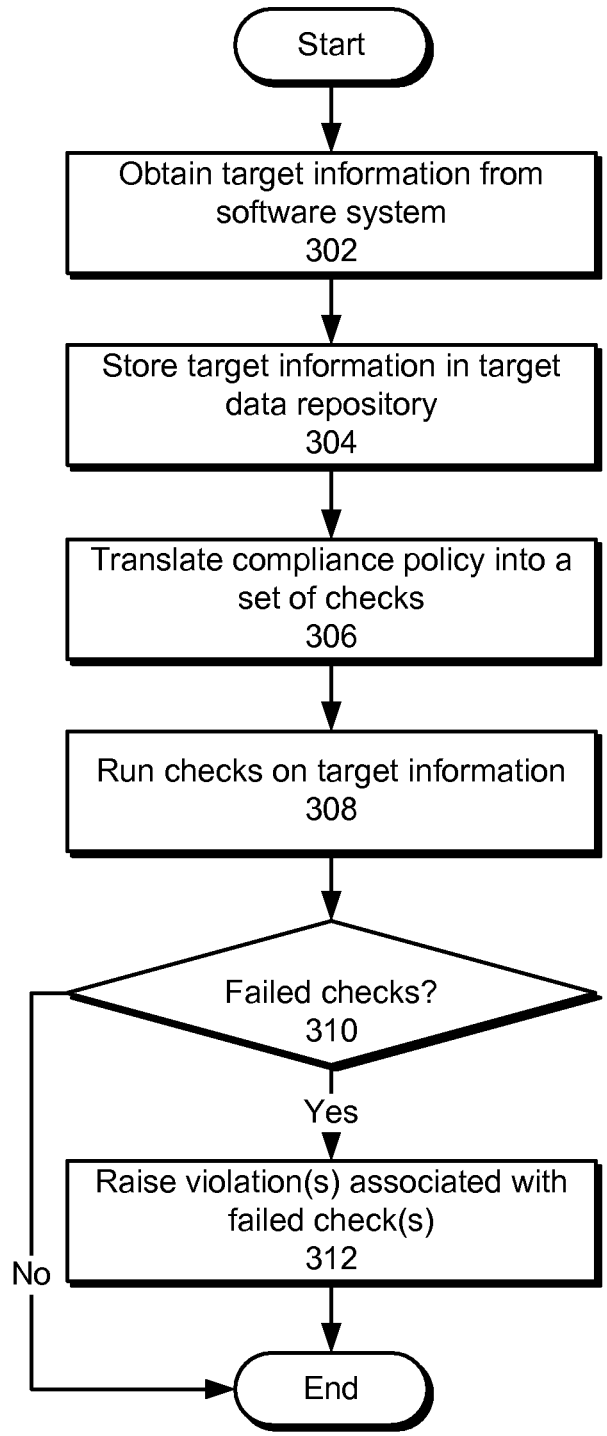
FIG. 3 shows a flowchart of software system monitoring in accordance with an embodiment of the present invention.

FIG. 3 shows a flowchart of software system monitoring in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

First, target information is obtained from the software system (operation 302). As described above, the software system may include multiple targets (e.g., databases, applications, operating systems, processes, etc.) executing in a distributed environment, such as a data center. The target information may include configuration parameters, open and closed ports, and/or other settings and operating data for each of the targets. The data may be obtained using one or more agent processes which serve as interfaces with the software system. The target information is then stored in a target data repository (operation 304).

The target information may be checked for violations of a compliance policy for the software system. To do so, the compliance policy is translated into a set of checks (operation 306), which are then run on the target information (operation 308). For example, the compliance policy may be an XML document that includes a set of configuration standards. Each configuration standard may include a set of XML tags and elements that provide a test of conformity to the configuration standard. The test may use a script, such as a SQL script, or another comparison tool to examine one or more data fields in the target data repository for conformity to the configuration standard. The XML file may be parsed to obtain the test, which may be executed to determine if the configuration standard is violated by the software system.

If any checks fail (operation 310), violations associated with the failed checks are raised (operation 312). The violations may then be resolved by retrieving change packages using links or pointers in the compliance policy and automatically deploying the change packages, as described above.

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
 collecting information from a plurality of components of a software system;
 storing the collected information in a data repository;
 parsing a compliance policy for the software system to determine a compliance test that includes a predefined database query for the data repository, wherein the database query produces a result which indicates whether the software system is in compliance with a configuration requirement for the software system;
 determining whether the software system violates the compliance policy by performing the database query of the compliance test on the data repository;
 in response to determining that the software system violates the compliance policy:
  retrieving a change package for the compliance test; and
  automatically deploying the change package to the software system to resolve the violation;
 evaluating the software system using the compliance policy after automatically deploying the change package; and
 clearing the violation in response to determining that the software system conforms to the compliance policy.

2. The method of claim 1, wherein the compliance policy is user-authored by an administrator of the software system.

3. The method of claim 1, wherein the violation is associated with at least one of a password reset, a security attack, a port, a configuration file, a software patch, an application type, an application version, and a standard.

4. The method of claim 1, wherein the software system comprises an enterprise solution.

5. The method of claim 1, wherein the change package is user-specified by an administrator of the software system.

6. The method of claim 1, wherein the compliance policy comprises an Extensible Markup Language (XML) document.

7. A system comprising:
 a change package repository comprising a set of change packages for the software system;
 a data repository configured to store information collected from a plurality of components of the software system; and
 a configuration framework configured to parse a compliance policy to determine a compliance test that includes a predefined database query, wherein the database query produces a result which indicates whether the software system is in compliance with a configuration requirement for the software system, and wherein the configuration framework comprises:

a configuration engine configured to determine whether the software system violates the compliance policy by performing the database query of the compliance test on the data repository; and an enforcement engine configured to:
retrieve a change package for the compliance test from the set of change packages using the compliance policy; and
automatically deploy the change package to the software system to resolve the violation;

wherein the configuration framework is further configured to evaluate the software system using the compliance policy after automatically deploying the change package, and to clear the violation.

8. The system of claim 7, further comprising:
an agent process configured to:
obtain information from the software system; and
store the information in the data repository;
wherein the stored information is used by the configuration framework to determine whether the software system violates the compliance policy.

9. The system of claim 7, wherein the compliance policy is user-authored by an administrator of the software system, and wherein the change package is user-provided by the administrator of the software system.

10. The system of claim 7, wherein the violation is associated with at least one of a password reset, a security attack, a port, a configuration file, a software patch, an application type, an application version, and a standard.

11. The system of claim 7, wherein the software system comprises an enterprise solution.

12. The system of claim 7, wherein the compliance policy comprises an Extensible Markup Language (XML) document.

13. A non-transitory computer-readable storage medium storing instructions that when executed by a computer cause the computer to perform a method comprising:
collecting information from a plurality of components of a software system;
storing the collected information in a data repository;
parsing a compliance policy for the software system to determine a compliance test that includes a predefined database query for the data repository, wherein the database query produces a result which indicates whether the software system is in compliance with a configuration requirement for the software system;
determining whether the software system violates the compliance policy by performing the database query of the compliance test on the data repository;
in response to determining that the software system violates the compliance policy:
retrieving a change package for the compliance test; and
automatically deploying the change package to the software system to resolve the violation;
evaluating the software system using the compliance policy after automatically deploying the change package; and
clearing the violation in response to determining that the software system conforms to the compliance policy.

14. The non-transitory computer-readable storage medium of claim 13, wherein the compliance policy is user-authored by an administrator of the software system.

15. The non-transitory computer-readable storage medium of claim 13, wherein the violation is associated with at least one of a password reset, a security attack, a port, a configuration file, a software patch, an application type, an application version, and a standard.

16. The non-transitory computer-readable storage medium of claim 13, wherein the software system comprises an enterprise solution.

17. The non-transitory computer-readable storage medium of claim 13, wherein the change package is user-provided by an administrator of the software system.

18. The non-transitory computer-readable storage medium of claim 13, wherein the compliance policy comprises an Extensible Markup Language (XML) document.

* * * * *